United States Patent [19]

Federico et al.

[11] Patent Number: 4,550,382
[45] Date of Patent: Oct. 29, 1985

[54] FILTERED INPUTS

[75] Inventors: Anthony M. Federico, West Webster; Ernest L. Legg; Stephen P. Wilczek, both of Fairport; Hari K. Prasad, Henrietta; James J. Petery, Webster, all of N.Y.

[73] Assignee: Xerox Corporation, Stamford, Conn.

[21] Appl. No.: 421,006

[22] Filed: Sep. 21, 1982

[51] Int. Cl.[4] ................. G03G 15/00; G06F 15/20
[52] U.S. Cl. ......................... 364/572; 364/138; 364/525; 355/14 C
[58] Field of Search ............ 364/572, 514, 518, 573, 364/525, 138; 340/825.06; 355/3 R, 14 C

[56] References Cited

U.S. PATENT DOCUMENTS

| | | | |
|---|---|---|---|
| 3,614,742 | 10/1971 | Watson et al. | 364/200 |
| 3,699,529 | 10/1972 | Wesley et al. | 364/200 |
| 3,760,365 | 9/1973 | Kurtzberg et al. | 364/200 |
| 3,787,816 | 1/1974 | Hauck et al. | 364/200 |
| 3,805,247 | 4/1974 | Zucker et al. | 364/200 |
| 3,812,469 | 5/1974 | Hauck et al. | 364/200 |
| 3,916,383 | 10/1975 | Malcolm | 364/200 |
| 3,978,452 | 8/1976 | Barton et al. | 364/200 |
| 3,983,539 | 9/1976 | Faber et al. | 364/200 |
| 3,983,541 | 9/1976 | Faber et al. | 364/200 |
| 4,044,334 | 8/1977 | Bachman et al. | 364/200 |
| 4,047,003 | 9/1977 | LaRocca et al. | 364/138 |
| 4,064,395 | 12/1977 | Schubeler et al. | 364/107 |
| 4,084,228 | 4/1978 | Dufond et al. | 364/200 |
| 4,099,252 | 7/1978 | Danco | 364/200 |
| 4,123,794 | 10/1978 | Matsumoto | 364/101 |
| 4,123,795 | 10/1978 | Dean | 364/200 |
| 4,138,718 | 2/1979 | Toke | 364/200 |
| 4,162,536 | 7/1979 | Morley | 364/900 |
| 4,170,791 | 10/1979 | Daughton et al. | 364/900 |
| 4,186,299 | 1/1980 | Batchelor | 355/14 R X |
| 4,199,811 | 4/1980 | Borgerson | 364/200 |
| 4,215,395 | 7/1980 | Bunyard | 364/101 |
| 4,219,873 | 8/1980 | Kober et al. | 364/200 |
| 4,224,664 | 9/1980 | Trinchieri | 364/200 |
| 4,227,245 | 10/1980 | Edblad | 364/46 |
| 4,228,495 | 10/1980 | Bernhard et al. | 364/101 |
| 4,229,790 | 10/1980 | Gilliland | 364/200 |
| 4,242,732 | 12/1980 | Campbell | 364/572 X |
| 4,253,145 | 2/1981 | Goldberg | 364/200 |
| 4,285,061 | 8/1981 | Ho | 364/724 X |
| 4,304,001 | 12/1981 | Cope | 371/8 |
| 4,327,993 | 5/1982 | Gauronshi | 355/14 SH |
| 4,356,475 | 10/1982 | Neumann et al. | 340/715 X |
| 4,357,605 | 11/1982 | Clements | 340/825.06 X |
| 4,414,638 | 11/1983 | Talambiras | 364/573 X |
| 4,453,218 | 6/1984 | Sperinde et al. | 364/572 X |

Primary Examiner—Edward J. Wise
Attorney, Agent, or Firm—Ronald F. Chapuran

[57] ABSTRACT

The present invention includes a plurality of input/output processors communicating with a master processor. Each of the input/output processors has a filtering mechanism to filter the inputs before transmission to the master over the communication channel precluding the necessity of filtering at the master. More importantly, the shared communications system is not loaded down with every change of an input. Because of this feature, only meaningful changes are put on the communication line, thus substantially reducing its load which makes its effective response time stay high. The inputs when received at the master can be immediately handled to improve the central processor response time. Two types of filtering are provided, in particular, transition and debounce filtering to respond to switch and sensor inputs. Also, there is provided a means to programmably select the type of filter and the time period of filtering.

10 Claims, 7 Drawing Figures

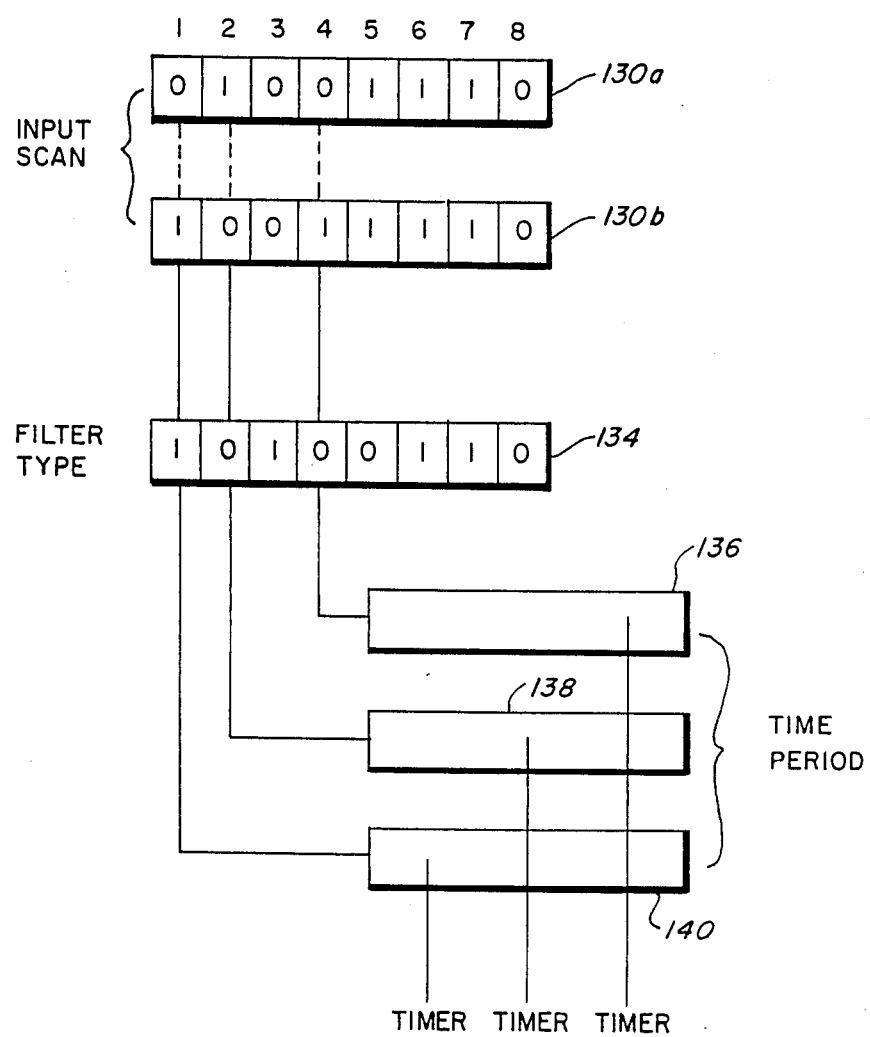

FILTERED INPUTS

This invention relates to multiprocessor machine controls, and in particular, to the filtering of inputs to input/output processors.

For further information relating to this application, reference is made to the following companion U.S. patent applications filed concurrently herewith to the common assignee U.S. Ser. No. 420,965, Remote Process Crash Recovery; U.S. Ser. No. 420,988, Process Scheduler in an Electronic Control; U.S. Ser. No. 420,991, Distributed Processing Environment Fault Isolation; U.S. Ser. No. 420,992, Common Control in Multiple Processors By Chaining Tasks; U.S. Ser. No. 420,993, Virtual Machine Control; U.S. Ser. No. 420,994, Task Control Manager; U.S. Ser. No. 420,995, Control System Job Recovery After a Malfunction; U.S. Ser. No. 420,999, Separate Resetting of Processors in a Multiprocessor Control; U.S. Ser. No. 421,007, Multiprocessor Control Synchronization and Instruction Downloading; U.S. Ser. No. 421,008, Multiprocessor Memory Map; U.S. Ser. No. 421,009, Changing Portions of Control in a ROM Based System; U.S. Ser. No. 421,010, Race Control Suspension; U.S. Ser. No. 421,011, Control Fault Detection for Machine Recovery and Diagnostics Prior to Malfunction; U.S. Ser. No. 421,016, Single Point Microprocessor Reset; and U.S. Ser. No. 421,615, Control Crash Diagnostics.

In a multiprocessor control environment having a plurality of interconnected microprocessors sharing the control of a machine, the transmission of the interprocessor communication is critical. It is important not to tie up the communication system by too frequent or unnecessary transmissions. This can be particularly true in a high noise machine environment requiring retransmission of invalid or incorrect messages. Frequent transmissions and a heavy communication load could seriously increase the delay between the stimulus and response and effect operation of the machine.

It would be desirable, therefore, to provide the means in a multiprocessor environment of minimizing the communication between the processors, and in particular, minimizing the amount of erroneous transmissions requiring retransmission.

In prior art data filtering techniques in machine controls, the type of filtering and time period of data filtering is generally fixed. Usually each input port to a microprocessor has the same predetermined type of filtering and time period of filtering for each of the inputs to the input port. Also, in most cases, the inputs to a particular input port must be similar, i.e. either all switches or all sensors. If it is necessary to change the filtering (either type or time period) for a particular input, it is usually necessary to move the input to another input port having the desired filtering characteristics. This may involve expensive and time consuming changes in harnesses and other connecting circuitry.

It would be desirable, therefore, to provide the means to easily alter the filtering characteristics of a particular input to an input port without expensive and time consuming changes.

It is, therefore, an object of the present invention to provide new improved communications among processors sharing a common communication channel. It is a further object of the present invention to minimize the amount of communication between input/output processors with other processors. It is another object of the present invention to be able to readily alter the filtering characteristics of an input to an input port without costly changes. It is another object of the present invention to be able to programmably change the time period of type of filtering for a given input.

Briefly, the present invention includes a plurality of input/output processors communicating with a central processor. Each of the input/output processors has a filtering mechanism to filter the inputs before transmission to the central processor over the communication channel precluding the necessity of filtering at the central processor. The inputs when received at the central processor can be immediately handled to reduce its load and thus improve its response time. Two types of filtering are provided, in particular, transition and debounce filtering to respond to switch and sensor inputs. Also, there is provided a means to programmably select the type of filter and the time period of filtering. The programmability allows the system to be customized to changing applications.

Further advantages of the present invention will become apparent as the following description proceeds, and the features characterizing the invention will be pointed out with particularity in the claims annexed to and forming a portion of this specification.

FIG. 7 illustrates the method of selecting a particular filter and related time period.

Figure 1:
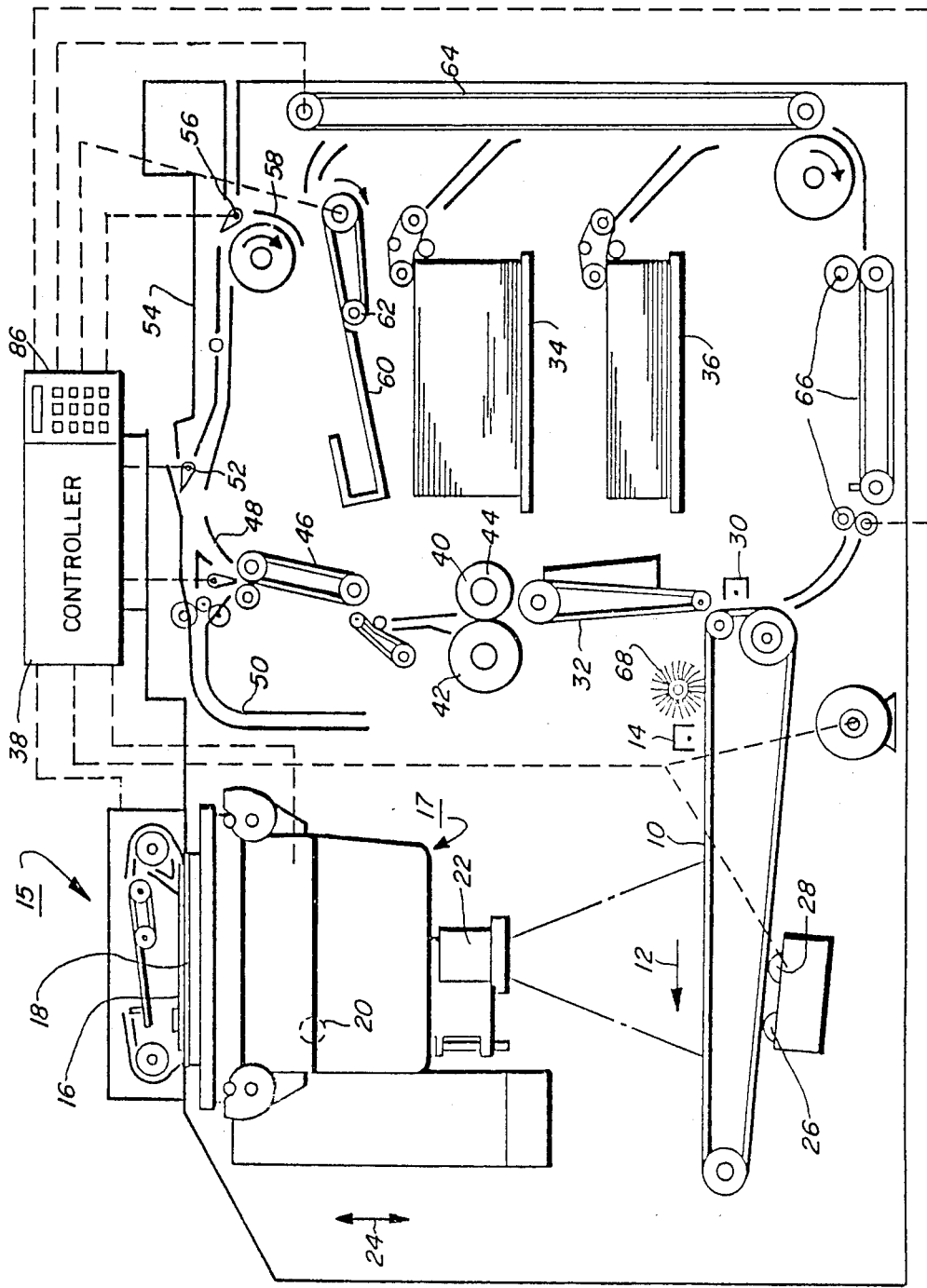
FIG. 1 is an elevational view of a reproduction machine typical of the type of machine or process that can be controlled in accordance with the present invention.

With reference to FIG. 1, there is shown an electrophotographic printing or reproduction machine employing a belt 10 having a photoconductive surface. Belt 10 moves in the direction of arrow 12 to advance successive portions of the photoconductive surface through various processing stations, starting with a charging station including a corona generating device 14. The corona generating device charges the photoconductive surface to a relatively high substantially uniform potential.

The charged portion of the photoconductive surface is then advanced through an imaging station. At the imaging station, a document handling unit 15 positions an original document 16 facedown over exposure system 17. The exposure system 17 includes lamp 20 illuminating the document 16 positioned on transparent platen 18. The light rays reflected from document 16 are transmitted through lens 22. Lens 22 focuses the light image of original document 16 onto the charged portion of the photoconductive surface of belt 10 to selectively dissipate the charge. This records an electrostatic latent image on the photoconductive surface corresponding to the informational areas contained within the original document.

Platen 18 is mounted movably and arranged to move in the direction of arrows 24 to adjust the magnification of the original document being reproduced. Lens 22 moves in synchronism therewith so as to focus the light image of original document 16 onto the charged portion of the photoconductive surface of belt 10.

Document handling unit 15 sequentially feeds documents from a holding tray, in seriatim, to platen 18. The document handling unit recirculates documents back to the stack supported on the tray. Thereafter, belt 10 advances the electrostatic latent image recorded on the photoconductive surface to a development station.

At the development station a pair of magnetic brush developer rollers 26 and 28 advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to the transfer station. At the transfer station a copy sheet is moved into contact with the toner powder image. The transfer station includes a corona generating device 30 which sprays ions onto the backside of the copy sheet. This attracts the toner powder image from the photoconductive surface of belt 10 to the sheet.

The copy sheets are fed from a selected one of trays 34 or 36 to the transfer station. After transfer, conveyor 32 advances the sheet to a fusing station. The fusing station includes a fuser assembly for permanently affixing the transferred powder image to the copy sheet. Preferably, fuser assembly 40 includes a heated fuser roller 42 and backup roller 44 with the sheet passing between fuser roller 42 and backup roller 44 with the powder image contacting fuser roller 42.

After fusing, conveyor 46 transports the sheets to gate 48 which functions as an inverter selector. Depending upon the position of gate 48, the copy sheets will either be deflected into a sheet inverter 50 or bypass sheet inverter 50 and be fed directly onto a second gate 52. Decision gate 52 deflects the sheet directly into an output tray 54 or deflects the sheet into a transport path which carries them on without inversion to a third gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60. Duplex tray 60 provides intermediate or buffer storage for those sheets which have been printed on one side for printing on the opposite side.

In order to complete duplex copying, the previously simplexed sheets in tray 60 are fed seriatim by bottom feeder 62 back to the transfer station for transfer of the toner powder image to the opposed side of the sheet. Conveyers 64 and 66 advance the sheet along a path which produces a sheet inversion. The duplex sheets are then fed through the same path as the previously simplexed sheets to be stacked in tray 54 for subsequent removal by the printing machine operator.

Invariably after the copy sheet is separated from the photoconductive surface of belt 10, some residual particles remain adhering to belt 10. These residual particles are removed from the photoconductive surface thereof at a cleaning station. The cleaning station includes a rotatably mounted brush 68 in contact with the photoconductive surface of belt 10.

A controller 38 and control panel 86 are also illustrated in FIG. 1. The controller 38 as represented by dotted lines is electrically connected to the various components of the printing machine.

Figure 2:
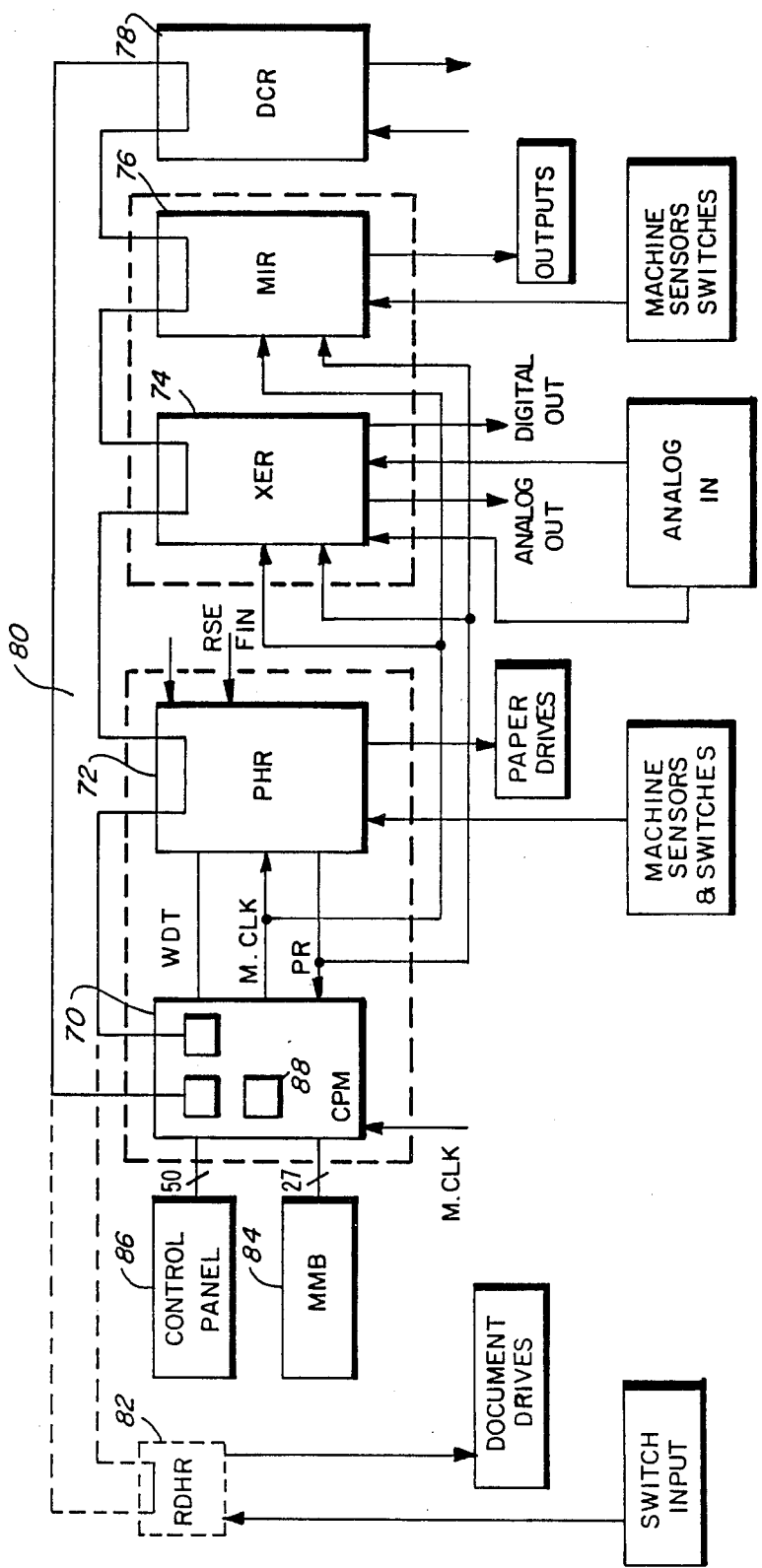
FIG. 2 is a block diagram of the control boards for controlling the machine of FIG. 1.

With reference to FIG. 2, there is shown in further detail the controller 38 illustrated in FIG. 1. In particular, there is shown a central processing master (CPM) control board 70 for communicating information to and from all the other control boards, in particular the Paper Handling Remote (PHR) control board 72 controlling the operation of all the paper handling subsystems such as paper feed, registration and output transports.

Other control boards are the Xerographic Remote (XER) control board 74 for monitoring and controlling the xerographic process, in particular the analog signals, the Marking and Imaging Remote (MIR) control board 76 for controlling the operation of the optics and xerographic subsystems, in particular the digital signals. A Display Control Remote (DCR) control board 78 is also connected to the CPM control board 70 providing operation and diagnostic information on both an alphanumeric and liquid crystal display. Interconnecting the control boards is a shared communication line 80, preferably a shielded coaxial cable or twisted pair with suitable communication protocol similar to that used in a Xerox Ethernet ® type communication system. For a more detailed explanation of an Ethernet ® type Communication System, reference is made to pending applications D/78108, U.S. Ser. No. 205,809; D/78108Q2, U.S. Ser. No. 205,822 and D/78108Q3, U.S. Ser. No. 205,821, all filed Nov. 10, 1980 and incorporated herein as references.

Other control boards can be interconnected to the shared communication line 80 as required. For example, a Recirculating Document Handling Remote (RDHR) control board 82 (Shown in phantom) can be provided to control the operation of a recirculating document handler. There can also be provided a not shown Semi-Automatic Document Handler Remote (SADHR) control board to control the operation of a semi-automatic document handler, a not shown Sorter Output Remote (SOR) control board to control the operation of a sorter, and a not shown Finisher Output Remote (FOR) control board to control the operation of a stacker and stitcher.

Each of the controller boards preferably includes an Intel 8085 microprocessor with suitable Random Access Memory (RAM) and some form of Read Only Memory such as ROMs or EPROMs. Also interconnected to the CPM control board is a Master Memory Board (MMB) 84 with suitable ROMs/EPROMs to control normal machine operation and a control panel board 86 for entering job selections and diagnostic programs. Also contained in the CPM board 70 is suitable nonvolatile memory. All of the control boards other than the CPM control board are generally referred to as remote control boards.

In a preferred embodiment, the control panel board 86 is directly connected to the CPM control board 70 over a 70 line wire and the memory board 84 is connected to the CPM control board 70 over a 36 line wire. Preferably, the Master Memory Board 84 contains 56K byte memory and the CPM control board 70 includes 2K ROM/EPROM, 6K RAM, and a 512 byte nonvolatile memory. The PHR control board 72 includes 1K RAM and 4K ROM/EPROM and preferably handles various inputs and outputs. The XER control board 74 handles 24 analog inputs and provides 12 analog output signals and 8 digital output signals and includes 4K ROM/EPROM and 1K RAM. The MIR board 76 handles 13 inputs and 17 outputs and has 4K ROM/EPROM and 1K RAM.

As illustrated, the PHR, XER and MIR boards receive various switch and sensor information from the printing machine and provide various drive and activation signals, such as to clutches, motors and lamps in the operation of the printing machine. It should be understood that the control of various types of machines and processes are contemplated within the scope of this invention.

Figure 3:
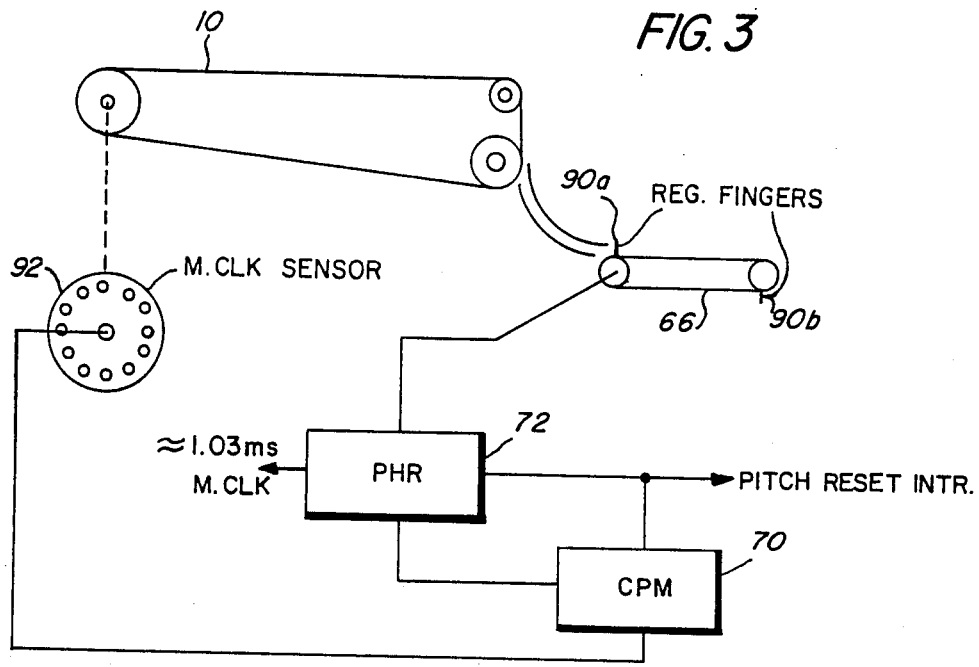
FIG. 3 illustrates some of the basic timing signals used in control of the machine illustrated in FIG. 1.

In accordance with one aspect of the present invention, a master timing signal, called the timing reset or Pitch Reset (PR) signal, as shown in FIG. 2, is generated by PHR board 72 and used by the CPM, PHR, MIR and XER control boards 70, 72, 74 and 76. With reference to FIG. 3, the Pitch Reset (PR) signal is generated in response to a sensed registration finger. Two registration fingers 90a, 90b on conveyor or registration transport 66 activate a suitable (not shown) sensor to produce the registration finger signal. The registration finger signal is conveyed to suitable control logic on the PHR control board 72.

In addition, a Machine Clock signal (MCLK) is conveyed to PHR 72 via the CPM control board 70 to suitable control logic. In response to predetermined MCLK signals, the pitch reset signal is conveyed to the CPM board 70 and the MIR and the XER remotes 74, 76. The Machine Clock signal is generated by a timing disk 92 or Machine Clock sensor connected to the main drive of the machine. The Machine Clock signal allows the remote control boards to receive actual machine speed timing information.

The timing disk 92 rotation generates approximately 1,000 machine clock pulses per second. A registration finger sensed signal occurs once for each paper feed and there are approximately 830 machine clock counts for every registration finger sensed signal as shown in FIG. 3. A belt hole pulse is also provided to synchronize the seam on the photoreceptor belt 10 with the transfer station to assure that images are not projected onto the seam of the photoreceptor belt.

Figure 4:
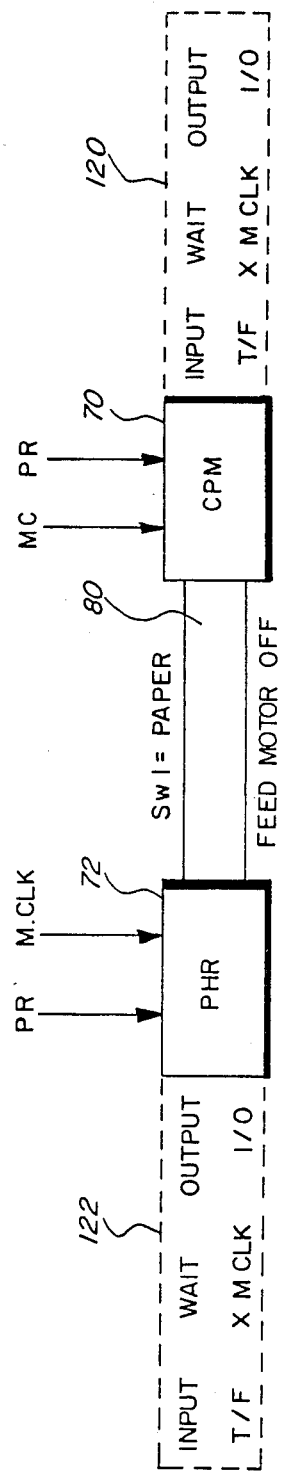
FIG. 4 illustrates the synchronization between a master control board and an input/output control board in accordance with the present invention.

With reference to FIG. 4 there is shown a typical communication between CPM control board 70 and a typical remote control board, in particular the PHR board 72. The CPM and PHR boards 70, 72 are connected through the communication channel 80. In general, upon receiving switch or sensor information from a remote or input/output board, the CPM board 70 responds with specific control information. In a typical case, upon receiving information from the PHR board 72, it is necessary, for example for the CPM board 70 to instruct the PHR board to turn a paper feed motor off.

In particular, it may be necessary for the PHR board 72 to turn off the motor at a certain time period after it receives its instructions. For example, the PHR board 72 could be instructed to turn off the motor 300 machine clocks after receiving the instruction. In previous systems it would have been necessary for the CPM control board 70 to instruct the PHR board 72 to turn the motor off at the correct time. In other words, the CPM control board would have to count clock pulses and convey the correct timing information as well as the specific turn off instruction to the PHR control board. This type of communication, particularly over a shared communication system, is restricted to relatively non-time critical operations.

However, in accordance with the present invention, the Machine Clock signal is not only conveyed to the CPM board 70 but also simultaneously to the PHR board 72. It is only necessary therefore for the CPM board 70 to generally instruct the PHR board 72 to turn the feed motor off after 300 machine clocks after receiving a switch or sensor change to the appropriate state. This is often referred to as downloading an instruction from the CPM board to a remote board. The CPM board can then forget about the PHR board and further timing instructions and continue on with other control functions. The PHR board 72, on the other hand, can turn off the motor 300 machine clocks after receiving the input change because it now has its own synchronized clock signal. Having received the instruction to turn the feed motor off 300 machine clocks after the input change, it has the precise Machine Clock signals to perform the function at the correct time.

A typical instruction sequence would be:
WAIT S1=Paper (that is, wait until a switch (S1) senses paper)
WAIT 300 machine clocks, then
FEED MOTOR OFF (turn off the feed motor)

In other words, the typical operation is to instruct the remote board to sense a certain switch or input and then perform a specified operation, often requiring a time delay. By merely having key timing signals such as a Pitch Reset, and the Machine Clock signals conveyed not only to the CPM board 70 but to all the remote control boards, it is possible to insure timely performance of required functions. There can be timely performance even though the communications system may be too busy, slow or inconsistent in the amount of time it requires to process a message from one processor to another. It should also be noted that this example is merely one sample of many different types of instructions that can be downloaded. The general format of performing this type of operation is merely to list the key elements, that is the input needed, the time period of delay in machine clocks or milliseconds, and the output required. For example,

| INPUT | WAIT | OUTPUT |
| --- | --- | --- |
| T/F | X mc. | I/O On/Off | where depending upon the input switch or sensor being true or false, a particular output transition state is made on or off after a time delay of X milliseconds or machine clocks. The instructions are maintained in RAM on both the CPM board 70 as well as on the particular remote board receiving the instruction as illustrated in FIG. 4 by RAM section 120 on CPM board 70 and RAM section 122 on PHR board 72.

Another example of downloading these critical time events would be the CPM board 70 to send a message to the MIR board 76 to flash a lamp, in particular to flash the lamp 50 machine clocks after the Pitch Reset. If the MIR board 76 did not have direct access to the machine clock and Pitch Reset signal, it would have to wait for this timing information from another source. However, the general message or instruction is downloaded to the MIR board 76 and after sensing the Pitch Reset signal directly, the MIR board can count its own 50 machine clocks and flash the lamp at the required time with no further communication with a central or master processor in particular CPM board 70.

The CPM board 70 is able to centrally control operations and yet be able to download messages, offloading local control to the input/output or remote control boards. This takes a great deal of the processor load off the CPM board and places the processing load in the input/output control boards. The input/output control boards can be instructed well in advance that at a certain time they should perform a certain function. The input/output control board, not generally having a relatively heavy workload of processing, can perform these tasks very efficiently.

In addition, several messages can be downloaded to a remote control board. The remote control board then sorts out the priority and takes care of the proper timing of the messages. That is, a recently received message may require attention before an earlier received message. The remote control board makes this type of determination from information provided by the CPM control board.

Figure 5:
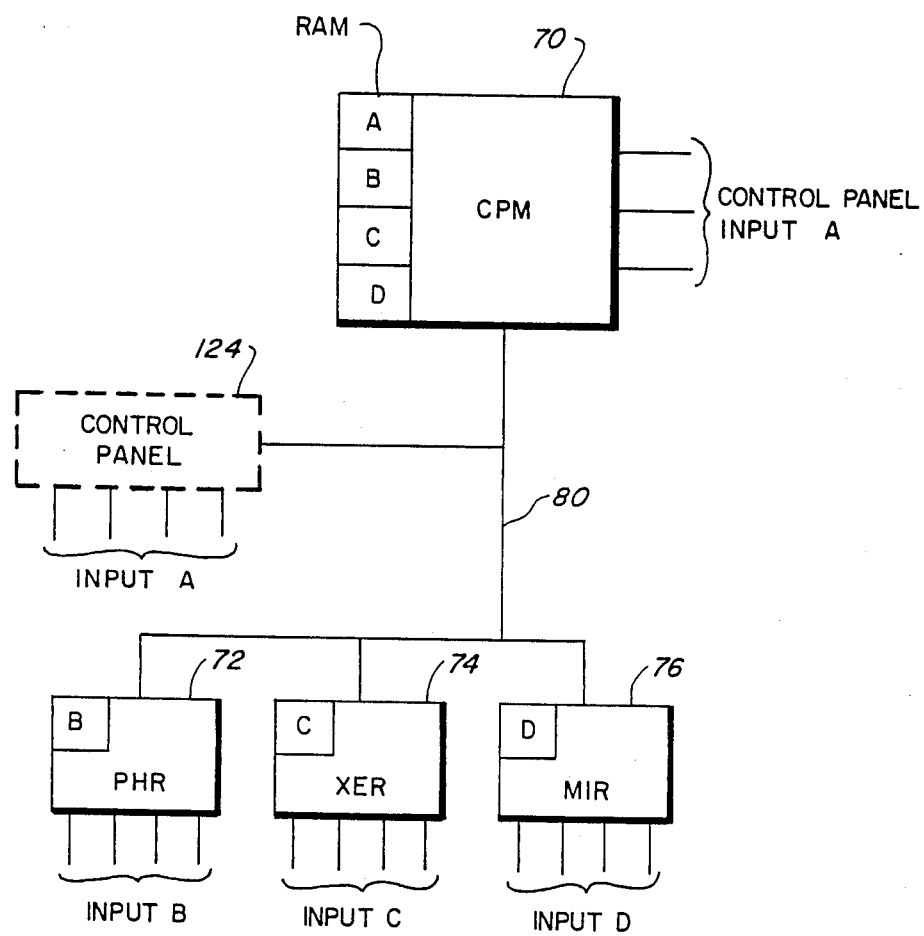
FIG. 5 illustrates the common mapping of data between an input/output control board and a master control board and the downloading of instructions.

In accordance with another feature of the present invention, FIG. 5 illustrates the mapping of the input signals in a common data base. That is, the inputs to the various remote boards such as switch and sensor signals are stored both in the RAM of the remote board receiving the signals, as well as in a section of RAM in the CPM board 70.

For example, inputs labeled B, shown at the PHR remote board 72, are stored in a suitable RAM location B on PHR board 72 as well as in a suitable RAM location B on CPM board 70. The C inputs, illustrated at the XER board 74, are stored in RAM location C on the XER board 74 as well as in a suitable RAM location C on the CPM board. The D inputs to MIR board 76 are stored in RAM location D on MIR board 76 and the CPM board in RAM location D.

It is also possible that certain of the inputs such as labeled A may go directly to the CPM control board 72. This information could be, for example, control panel information. Suppose that because of changing control requirements, it was necessary to change an input going to one control board and deliver the input to another control board. For example, suppose it was necessary to shift the input D from the MIR board to the XER board or, for example, to have the input A go to a special control panel 124.

According to the present invention all processors responding to various inputs scan the values of the inputs in the CPM RAM rather than in the processor receiving the input. That is, the allocated RAM space on the CPM board associated with the various inputs contains all the input values as the values are received on the different boards. These values are conveyed over communication channel 80 to the CPM board. These values are continually updated as changing inputs come in and are available for any portion of control needing to respond to those inputs.

A particular control procedure located, for example, on CPM board 70 or PHR board 72, waiting to respond to an input to MIR board 76 does not need scan the MIR board RAM or wait for communications from the MIR board over the channel 80. The particular control procedure can scan the D input values as stored in RAM on CPM board 70. Thus, all the input signals are mapped to RAM locations on the CPM board 70. It thus becomes transparent to the control procedure or code operating on a particular input whether or not the input has been moved to another control board. This also minimizes communications and, in general, an input is read more often than it changes. In a similar manner, the outputs to the remote boards such as downloaded instructions are gathered in a common data store.

In general, as shown in FIG. 5, the RAM in CPM board 72 has allocations for CPM inputs as well as the inputs associated with each of the other input/output control boards. Since all of the input is stored in the central memory location on the CPM control board, it is not necessary for a particular input/output control board to communicate with another input/output control board over a separate line to receive input or output information.

It is only necessary for the input/output control board to communicate with the CPM control board over the shared line 80 and read the information from the appropriate CPM RAM location. In general, as the inputs to a particular control board change, this information is updated in the RAM section in CPM corresponding to that particular control board. This changed information is optionally provided to the other remote boards by the input/output board on specific request, and the remote board responds to this information as required.

Figure 6:
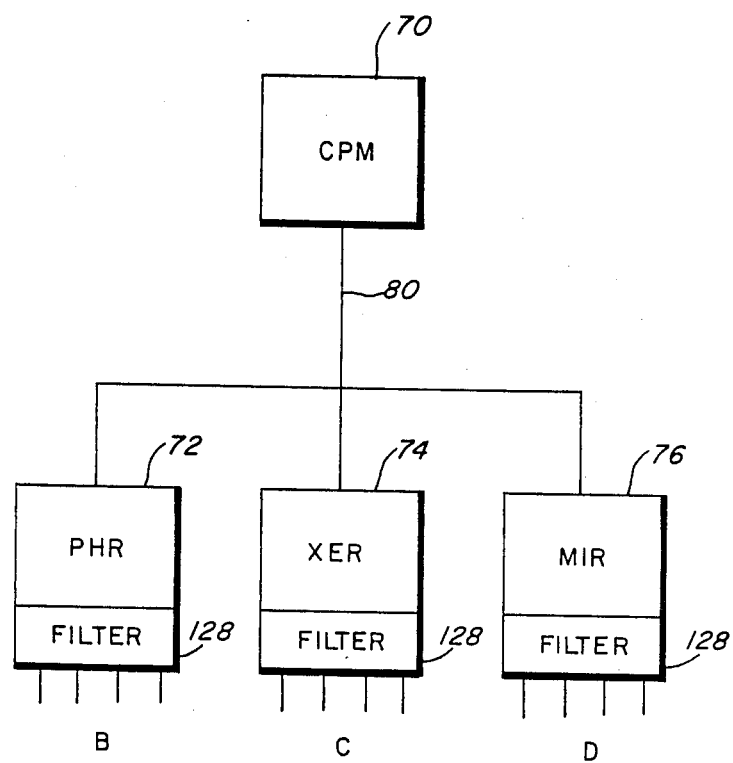
FIG. 6 illustrates the filtering of input data at an input/output control board.

With reference to FIG. 6, there is shown the CPM control board 70 connected to the PHR control board 72, the XER control board 74 and the MIR control board 76 through the communication channel 80. As shown in FIG. 5, normally the input signals illustrated as input B, input C and input D, are received by the control boards and communicated over the channel 80 to the CPM board 70. Often, the input signal information can be invalid and garbled, particularly in a noisy environment such as in the operation of a machine or process. Filtering of the information, if done at all, is usually done at the master control such as the CPM board 70. This creates a great deal of unnecessary transmissions across the communication channel 80 in sorting out the valid from the invalid signals.

In accordance with another feature of the present invention, as shown in FIG. 6, filtering is provided at the remote boards. A filter 128 is provided on each of the remote boards to filter the incoming information before transmission over the communication channel 80. Preferably, the filtering is done in software, but it should be understood that more expensive hardware filters could also be used.

Preferably, there are two types of input filters, a transition filter usually associated with a sensor input and a debounce filter usually associated with a switch input. Both of these filter techniques have an associated time period. Both the filter times and the type of filter for each particular input is programmable.

For example, in a preferred embodiment there are 32 inputs to the PHR board 72. Identified with each of the 32 inputs is a designated bit in the RAM of the PHR board 72 identifying the type of filter. That is, a 0 or 1 identifies either the transition or debounce filtering. In addition, associated with each of the inputs are an additional two bytes of information. One of the bytes from a timer table represents the designated time period of filtering for that particular input. In a preferred embodiment time periods vary from approximately four milliseconds up to one second. The other byte represents a software counter to count down the time period.

In operation, once there is a change or transition for a particular switch or sensor input, it is necessary to first determine the type of filtering required for that particular switch or sensor. The RAM location for that particular input is, therefore, scanned for 0 or 1.

Next, the byte of RAM from the timer table, is read to give the time period for filtering of the particular input. Assuming, for example, the period is 500 milliseconds, this time period is loaded into the second byte associated with a particular input. This second byte of RAM location is the counter. It will count down to 0 to indicate the end of the filtering period. In this particular example, the counter will count down from 500 milliseconds. It should be noted that the timer period or history byte associated with each of the inputs is programmable and thus the amount of time for filtering of a specific input can be changed.

The debounce type filter works as follows. Once an input transition takes place, the timer relating to the specific input is activated. When the timer is activated, it continues counting only during the time that the transition is recognized. In other words, assuming a transition from a low to a high, the high reading will begin the activation of the counter. If during the count down, there is a transition back to low, the counter will suspend counting until another high is sensed. The counter will then resume the coundown from 500 milliseconds. The countdown is cumulative and continues until a total of 500 milliseconds of the high level has been recognized. At this point the high level transition is accepted as valid and mapped to the appropriate CPM RAM location memory map if the high reading has been maintained for the last 500 milliseconds.

The transition type filter operates as follows: Once an input transition takes place, the associated timer for the specified time period is activated and the transition level is immediately mapped to the appropriate CPM RAM location. The associated counter is loaded with the time period and begins the countdown. If at any time during this time period, the input again changes, the change is ignored until the filter time lapses. At the end of the lapse of the time period, the input state or level at that time is updated. Thus, if the input has remained high, the CPM RAM map is unchanged. However, if the input has changed, the CPM is updated to reflect the change and a new timing sequence initiated.

With reference to FIG. 7, there is graphically illustrated a byte of RAM, 130a, with each of the eight bit positions corresponding to a particular input switch or sensor. The switches or sensors could be an input to any of the remote control boards. The RAM byte is continually scanned for input transitions and after a period of time, three of the inputs 1, 2 and 4 have shown input transitions, illustrated at 130b. Associated with each of the inputs is a bit of RAM byte 134, identifying by either a 1 or 0 whether or not the particular filter is the transition type or debounce type.

For example, input 1 can be assumed to be a sensor identified by (1) and therefore inputs 2 and 4 are switches, identified by (0). It should be noted, however, that it is not necessary to restrict a switch or sensor to a particular type of filter. Also related to the type of filter and to each input is a time period as shown by memory bytes 136, 138 and 140. Each time period is then loaded into its associated counter or timer as illustrated.

In operation, the time periods 136, 138 and 140 are loaded in the appropriate timers. The timer is then activated for the time period specified in the locations 136, 138 and 140. If transition type filtering has been specified in byte 134 for input 1, then any further transitions during the specified time period will be ignored. If debounce type filtering has been specified for inputs 2 and 4, then the timers will count down only when the input remains at transition state. It should be observed that not only the type of filtering for any specific input can be changed by merely changing the flag in the location 134 but also the time periods associated with any specific input can be changed by altering the contents of the various memory locations such as bytes 136, 138 and 140.

While there has been illustrated and described what is at present considered to be a preferred embodiment of the present invention, it will be appreciated that numerous changes and modifications are likely to occurr to those skilled in the art, and it is intended in the appended claims to cover all those changes and modifications which fall within the true spirit and scope of the present invention.

What is claimed is:

1. In a reproduction machine having a plurality of operating components, a machine control comprising
   (a) a master controller including a processor and memory storage means,
   (b) a communication channel,
   (c) a remote controller connected to the master controller through the communication channel, the remote controller including a processor and memory storage for receiving switch and sensor signals from portions of the operating components of said machine, and
   (d) filtering means connected to said remote controller, said filtering means filtering said signals before transmission from the remote controller to the master controller via the communication channel, the filtering means including the means to recognize a first signal transition of said switch and sensor signals, and the means to activate a timer for a given period of time when the first transition is recognized.

2. The machine of claim 1, wherein the first signal transition is related to a switching device including the means to ignore a second signal transition for said switching device after the first signal transition.

3. The machine of claim 1 wherein the first signal transition is related to a sensing device including the means to determine if the first signal transition remains at the changed state throughout a predetermined time period.

4. The machine of claim 1 including the means to determine that the type of response to the first signal transition is a switch filtering response or a sensor filtering response.

5. The machine of claim 4 including the means to selectively change the type of response to the first signal transition.

6. The machine of claim 1 including the means to selectively change said given period of time.

7. In a system having a plurality of operating components, a plurality of sensors and switches associated with the operating components for providing data inputs and a controller for coordinating the interaction of the operating components, the controller comprising
   (a) a first control element including a processor and memory said processor being a master processor,
   (b) a communication channel,
   (c) a second control element connected to the first control element through the communication channel, the second control element including a remote processor and memory, the remote processor providing input data ports for a sensor and switch data inputs, (d) filtering means connected to the second control element, said filtering means responding to said data inputs at said input data ports for filtering said data before transmission from the second control element to the first control element via the communication channel, (e) means to provide a first type filtering for sensor data inputs, (f) means to provide a second type of filtering for switch data inputs, and (g) means to switch between the first and second types of filtering for a data input at a particular data port.

8. A data filtering technique in a machine having a photosensitive member, a control, and a plurality of operating components cooperating with one another to produce impressions on support material, the control including a processor having a first store and a second store, the operating components including a plurality of switch inputs and sensor inputs, each of the inputs having associated filtering characteristics including the type of filtering and the time period for filtering, the filtering technique including the steps of:

storing the status of each of the inputs in said first store, scanning said first store for an indication of an input transition in at least one of the inputs, determining the type of input for said at least one of the inputs, and accessing said second store to activate a timer for a given period of time associated with said at least one of the inputs.

9. The method of claim 8, wherein the step of accessing said second store includes the step of determining the type of filtering associated with said at least one of the inputs.

10. The method of claim 9, including the step of selectively altering the filter characteristics for a given input.

* * * * *